United States Patent [19]
Nerad

[11] 3,740,857
[45] June 26, 1973

[54] LENS BLANK AND FRAME COORDINATOR AND METHOD OF USING SAME

[75] Inventor: Frank O. Nerad, Burbank, Calif.

[73] Assignee: Armorlite Lens Company, Inc., Burbank, Calif.

[22] Filed: Dec. 3, 1971

[21] Appl. No.: 204,474

[52] U.S. Cl. .............................. 33/174 A, 33/200
[51] Int. Cl. ............................................. G01b 5/00
[58] Field of Search ...................... 33/28, 174 A, 200

[56] References Cited
UNITED STATES PATENTS
2,491,312  12/1949  Henry et al. ......................... 33/200

FOREIGN PATENTS OR APPLICATIONS
232,293  7/1963  Austria ................................ 33/200
1,051,677  2/1959  Germany .............................. 33/28
1,160,210  12/1963  Germany ............................. 33/200

Primary Examiner—Louis R. Prince
Assistant Examiner—Charles E. Phillips
Attorney—Sellers and Brace

[57] ABSTRACT

A method and device useful in determining if an ophthalmic lens blank is usable in preparing a lens for a particular spectacle frame selected by a patient. A plaque of planar material is imprinted with sets of graphical representations of various types of lens blank in full scale together with interpupillary and segment height scales for each. A selected frame is superimposed on the appropriate set of scales and properly adjusted to indicate the smallest blank usable in cutting out a lens for that particular frame.

14 Claims, 6 Drawing Figures

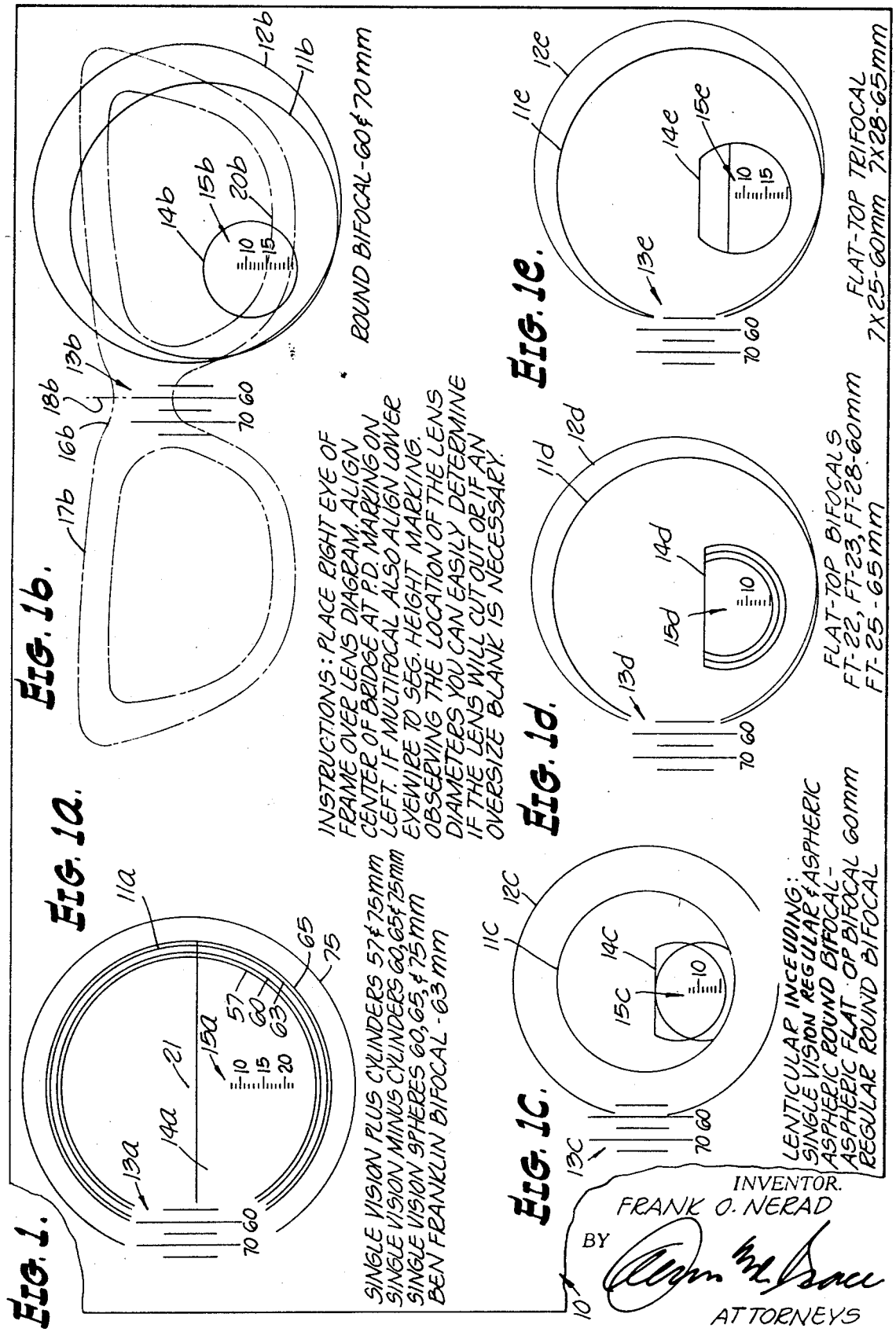

LENS BLANK AND FRAME COORDINATOR AND METHOD OF USING SAME

This invention relates to the mounting of ophthalmic lenses in spectacle frames, and more particularly to a unique lens blank and frame coordinator and to a method of utilizing the same to select the smallest appropriate lens blank from which to cut out a finished lens for a particular spectacle frame and also useful in checking the finished assembly for compliance with the patient's prescription.

The selection of the proper size spectacle frame to fit available lens blanks and still maintain correct alignment of the lens is a vexing problem to the ophthalmic dispenser because of the great variety of spectacle frames, particularly those of larger sizes currently in fashion. The doctor, after examining a patient, specifies a particular one of many different types of lenses together with the various prescription data for use by the technician in preparing the finished spectacle. The prescription data includes two values critically essential to the preparation of the finished lenses, these being the interpupillary distance between the patient's pupils, and the reading segment height in the case of multifocal lenses. The center of the interpupillary distance generally lies on a vertical bisector through the spectacle frame and the proper location of the reading segment for each of the several categories of multifocal lenses is determinable in a manner well known to those skilled in the ophthalmic lens art. If a single vision lens is involved, then the optician knows that the center of the lens is substantially on a horizontal bisector between the upper and lower inner edges of the spectacle frame.

In the case of multifocal lenses the reading segment can be contoured in a great variety of ways and its position will vary depending upon the particular correction factors applicable to each patient. However, these different designs can be conveniently classified in a relatively small number of categories, a fact utilized advantageous in the present invention.

For example, typical lens blanks are herein divided into five categories each containing two or more lens types, segment sizes or blank sizes. These blanks are graphically represented in superimposed relation properly related to a first scale for the interpupillary distance and a second scale at right angles thereto and representing the segment height scale. The interpupillary distance scale is essential in locating the optical center of the distance lens directly opposite the patient's pupil, whereas the segment height scale is essential in properly locating the reading segment vertically in the frame. The center of the interpupillary distance generally lies on a vertical bisector through the spectacle frame and the proper location of the reading segment for each of the several categories of multifocal lenses is determinable in a manner well known to those skilled in the ophthalmic lens art.

The use of the several sets of graphical representations involve superimposing the right hand opening of a selected spectacle frame over the two scales of the appropriate set of graphs and maneuvering it over the horizontal scale so as to locate the transverse bisector of the nose piece to coincide with the prescription reading for the far interpupillary distance. Thereafter the frame is further maneuvered to locate the inner lower edge of the lens opening directly over the appropriate prescription reading for the segment height as read on the vertical scale. The operator then visually observes the relationship of the periphery of the lens diagrams and lens opening in the frame. If the frame opening is within the lens diagram, the lens will cut out or meet prescription specifications. If the lens border falls within the frame opening, then the lens will not cut out and it would be necessary to select a larger lens size or smaller frame size, or select a different lens type in order to establish a proper relationship.

Accordingly, it is a primary object of the present invention to provide an improved and unique lens blank and spectacle frame coordinator and method for selecting the most appropriate size of lens blank usable in preparing a lens for a particular spectacle frame.

Another object of the invention is the provision of a universal gauge usable in selecting the minimum size of blank of a particular type to meet the prescription requirements.

Another object of the invention is the provision of a plaque having on the face thereof graphical representations of a plurality of types of lens blanks each associated with a related pair of interpupillary distance and segment height scales usable in selecting the most appropriate lens blank from which to make a cutout for a particular frame design or size.

Another object of the invention is the provision of a device for checking ophthalmic lenses mounted in a spectacle frame to determine the compliance of the finished assembly with prescription specifications.

These and other more specific objects will appear upon reading the following specification and claims and upon considering in connection therewith the attached drawing to which they relate.

Referring now to the drawing in which a preferred embodiment of the invention is illustrated:

FIG. 1 is a plan view of a plaque imprinted with graphical representations of five different types of lens blanks together with scales associated therewith useful in selecting a lens blank and frame combination for a particular prescription;

FIG. 1a is a graphical representation of a plurality of lens blanks and the related interpupillary distance and segment height scales for one type of blank including single vision, plus cylinders; single vision, minus cylinders; single vision spheres of various diameters as well as a typical Ben Franklin bifocal lens blank;

FIG. 1b is a graphical representation of a plurality of different sizes of round bifocal lens blanks together with the related interpupillary distance and segment height scales;

FIG. 1c is a graphical representation of a plurality of lens blanks of the lenticular type including, single vision, regular and aspheric; aspheric round bifocal; aspheric flat top bifocal; and regular round bifocal; together with the interpupillary distance and segment height scales;

FIG. 1d is a graphical representation of a plurality of different sizes of lens blanks of the flat top bifocal type, together with the related interpupillary distance and segment height scales; and FIG. 1e is a graphical representation of a plurality of flat top trifocal lenses, together with the related interpupillary distance and segment height scales.

Referring to the drawing, there is shown a plaque of stiff material 10 having imprinted in various areas thereof five different sets of graphical representations each including a plurality of lens blanks and a pair of scales lying at right angles to one another and in particular disposition relative to one end of the interpupillary distance, optical center of the lens, the center of the reading segment, and the upper edge of the segment. It will be understood that each set of lens blanks represents a particular type thereof and are generally similar to the others in their general arrangement and operating principles but differ in certain details readily understood by persons skilled in this art.

For example, referring to FIG. 1b, there is shown a pair of circles 11b,12b respectively representing round bifocal lens blanks of 60 and 70 mm diameter. Each is appropriately related to a first or interpupillary distance scale 13b disposed to the left of circles 11b and 12b. Superimposed on the round bifocal reading segment 14b of the two blanks is a second or segment height scale 15b with its left hand or reading edge located on the vertical bisector of the reading segment 14b. It will be understood that the similar edges of the vertical scales in FIGS. 1c to 1e are likewise on the vertical bisector of their respective reading segments.

Scale 13b is graduated from right to left and marked with appropriate interpupillary distance numerals 60, 70 to indicate the proper position for the transverse bisector of the nosepiece 16b of a typical spectacle frame 17b indicated in dot and dash lines. For example, frame 17b has been shifted horizontally along scale 13b until the center line of its nose piece, indicated at 18b, is in vertical alignment with the scale reading 60, assuming that this reading is the value of the interpupillary distance for the patient who has selected that frame.

The lateral disposition of the frame having been determined, the operator then proceeds to shift frame 17b vertically until the prescribed segment height reading on scale 15b coincides with the inner rim edge 20b of the frame. Thus, assuming that the doctor or dispenser has specified a segment height value of 15, frame 17b is shifted vertically until this graduation of scale 15b coincides with the inner rim edge 20b of the lens opening.

The frame is now properly positioned and the fitter merely observes the smallest one of the lens blanks of the circles 11b12b which lies entirely outside all portions of the inner opening of the frame. Thus, observing FIG. 1b, it will be noted that a portion of circle 11b lies within the frame opening and therefore this size lens blank is not usable. However, all portions of circle 12b lie outside the frame opening thereby indicating that this larger size blank is acceptable to fullfill the patient's specifications for this selected frame.

It will be understood that the same base reference characters described above in connection with FIG. 1b, but with different suffixes, are employed in connection with each of the FIGS. 1a, 1c, 1d, 1e to represent the same or similar components in those figures. It will likewise be understood that the spectacle frame is manipulated in the same manner over the graphical representations of each of these other figures to enable the operator to make a quick and accurate selection of all lens blanks that might be used in filling the patient's prescription.

In connection with FIG. 1a, it should be noted that certain of the lenses are of different sizes of single vision type whereas circle 11a represents a Ben Franklin bifocal of 62 mm diameter having horizontal division line between the distance segment in the upper half and the reading segment 14a in the lower half thereof. The segment height scale 15a is used only in connection with this particular fulseg bifocal lens blank. In selecting one of the several single vision lens blanks there represented, the fitter disregards scale 15a and locates the frame properly relative to scale 13a and then shifts it up and down as necessary to locate the horizontal bisector of the vertical dimension of the right hand lens opening substantially coincident with the center 21 of these circles. Thus, observing the lens blank diameters, the correct lens blank size can be easily chosen. However, if the frame opening can be shifted horizontally so as to fit entirely within a lens diameter, it could still be used if prismatic power is ground in the lens in order to place the optical center in the correct position on the lens. Thus the optician would readily know whether the frame requires an oversize blank and/or prism for decentration.

Previously it has been stated that the interpupillary scale is to be used with far interpupillary distance and the device is referenced to this measurement. However, it could also be easily referenced to the near interpupillary distance, because there is a substantially constant relationship between the two interpupillary distances.

Although it has been stated above that this device should be used with the exact size frame that the patient will eventually wear, if the doctor's or dispenser's sample is not of the exact size and the exact size is not available, he can still use the sample if he employs appropriate compensating calculations and adjustments in placing and reading the device. It will be recognized that the right eye of the frame should be used because the diagrams are right eye oriented. However, this device could be made for either right or left eye utilization.

While the particular lens blank and frame coordinator and method of using same herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A lens blank and spectacle frame coordinator for use in determining an appropriate lens blank and frame combination satisfying a patient's prescription comprising: a plaque having arranged thereon graphical representations of different typical types of lens blank, first scale means disposed to the nasal side of said representations for use in adjusting a selected spectacle frame thereover in accordance with the interpupillary data for a particular patient, second scale means extending at right angles to said first scale with its reading edge along the vertical bisector of the reading portion of a lens and having means usable in adjusting the lower inner edge of the selected frame to lie in registry with the reading on said second scale corresponding to the reading segment height value prescribed for said patient, and at least one outline representing the periphery of a typical lens blank.

2. A lens blank and frame coordinator as defined in claim 1 characterized in the provision in different areas of said plaque of graphical representations of a series of different types of lens blanks, each of said graphical representations including said first and second scales similarly arranged relative to one another and to said lens blank circles, and each of said graphical representations being similarly usable in selecting the appropriate lens blank for a particular spectacle frame.

3. A lens blank and frame coordinator as defined in claim 2 characterized in that one of said graphical representations is designed for use in selecting round bifocal types of lens blanks of different sizes.

4. A lens blank and frame coordinator as defined in claim 2 characterized in that one of said graphical representations is designed for use in selecting lenticular lens blanks including, single vision, regular and aspheric, aspheric round bifocal, aspheric flat top bifocal, and regular round bifocal.

5. A lens blank and frame coordinator as defined in claim 2 characterized in that one of said graphical representations is designed for use in selecting one of several different sizes of flat top bifocal lens blanks.

6. A lens blank and frame coordinator as defined in claim 2 characterized in that one of said graphical representations is designed for use in selecting one of several different sizes of flat top trifocal lens blanks.

7. A lens blank and frame coordinator as defined in claim 2 characterized in that one of said graphical representations is designed for use in selecting lens blanks including single vision plus cylinders, single vision minus cylinders, single vision spheres of various diameters, and Ben Franklin bifocal.

8. That method of determining whether a particular spectacle frame can be fitted with a lens cut from a particular size lens blank which method comprises: placing one end of the selected spectacle frame over a graphical representation of the chosen type of lens blank to be finished for mounting in the frame which graphical representation is equipped with first and second scales lying at right angles to one another in a common plane and respectively positioned to measure the interpupillary distance and the segment height distance values, adjusting the selected frame lengthwise of said first and second scales until the transverse bisector of the frame nose piece coincides with the prescribed interpupillary value of said first scale and the lower inner edge of the lens mounting opening in the frame is aligned with the prescribed segment height value of said second scale, and then visually observing whether all rim portions of the lens blank falls outside all portions of the frame lens seat.

9. That method defined in claim 8 characterized in the steps of providing a plurality of sets of said graphical representations including associated first and second scales for each set, at least certain of said sets representing multifocal lens blanks having characteristics differing from those of all other of said sets, whereby the user can employ any of said sets depending upon the type of lens prescribed for a particular patient.

10. That method defined in claim 9 characterized in the step of labeling each of said sets of graphical representations with information as to the size and type of each lens blank therein represented.

11. A lens blank and frame coordinator as defined in claim 1 characterized in that said graphical representations are arranged in sets of outlines of different types.

12. A lens blank and frame coordinator as defined in claim 11 characterized in that the outlines in said sets are superimposed upon one another and vary in size.

13. A lens blank and frame coordinator as defined in claim 11 characterized in that the outlines in said sets represent different distinctive types of lens blanks.

14. A lens blank and frame coordinator as defined in claim 13 characterized in that certain of said outlines represent single focal lens blanks and others thereof multifocal lens blanks.

* * * * *